July 12, 1932. F. A. HAYES 1,867,149
FRICTION TRANSMISSION
Filed Aug. 2, 1930 2 Sheets-Sheet 1
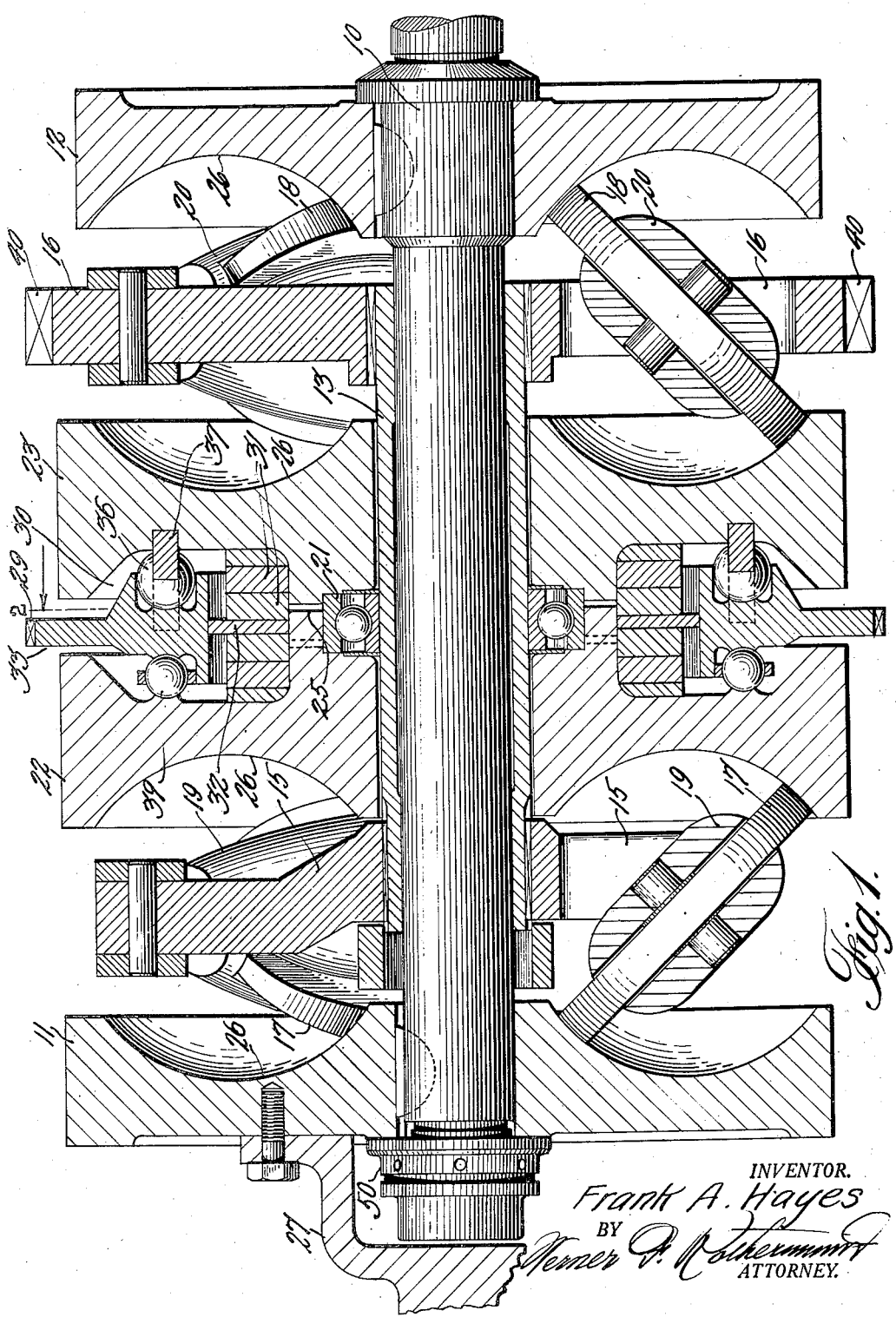
INVENTOR.
Frank A. Hayes
BY
ATTORNEY.

July 12, 1932.　　　F. A. HAYES　　　1,867,149
FRICTION TRANSMISSION
Filed Aug. 2, 1930　　2 Sheets-Sheet 2
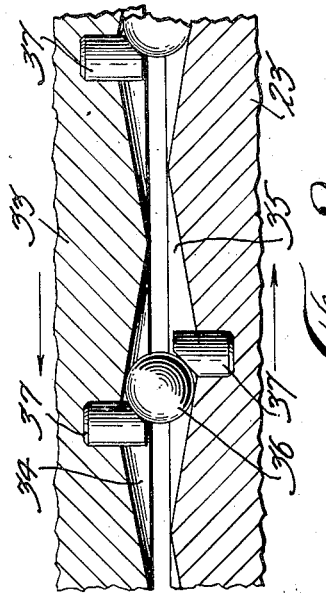
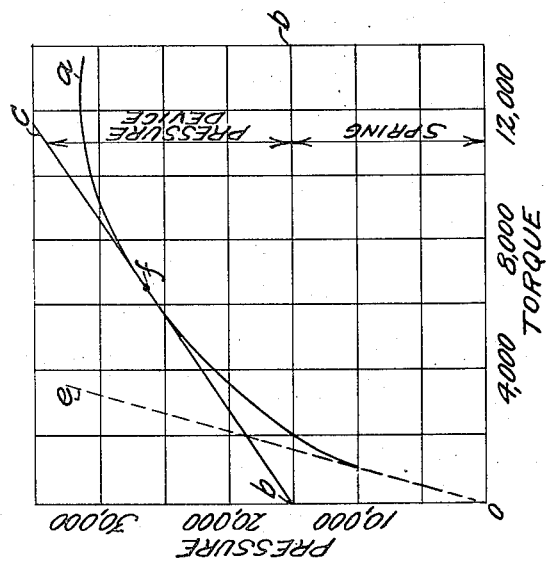
INVENTOR.
Frank A. Hayes
BY
ATTORNEY.

Patented July 12, 1932

1,867,149

UNITED STATES PATENT OFFICE

FRANK A. HAYES, OF MIDDLETOWN, NEW JERSEY

FRICTION TRANSMISSION

Application filed August 2, 1930. Serial No. 472,601.

This invention relates generally to variable speed power transmission mechanisms of the friction type, in which power from a prime mover is transmitted to a load through toroidally grooved coaxial disks and interposed friction rollers cooperating with the grooves in the disks. More particularly the invention relates to automatic "pressure devices" for transmission mechanisms of the type referred to, to provide the necessary pressure and consequent frictional engagement between the disks and rollers.

In the prior art certain structures have been proposed which provide the means for proportioning the axial pressures which load the frictionally engaged surfaces in order to prevent slippage. Some of these structures employ a cam secured to either the driving or the driven member or else to the reaction member said cam usually coacting with balls or rollers which are engaged on their opposed sides by a similar cam connected to one of the disks. Such a structure is disclosed in my prior Patent No. 1,698,229 and has given satisfactory performance with the type of transmission shown in Figure 1 of that patent and is generally quite suitable for mechanisms of the type in which the sets of rollers are "in series" (as regards power transmission) and can take different angular positions relative to the disks. However, in the so-called duplex type of transmission, that is, one in which two sets of rollers drive in parallel, it is essential that the rollers at all times assume an angle with the disks which is equal and opposite to the corresponding angle produced by those of the other set, since otherwise slippage and damage to the friction surfaces will result with a possible wrecking of the transmission. It has also been found that such detrimental results will occur if there is any relative angular play between either of the two corresponding disk surfaces.

In view of the requirements hereinbefore set forth, it will be seen that it would be impracticable to use a pressure device (in connection with a duplex type of transmission) which is dependent upon relative rotation or angular displacement of the disks for its actuation, and accordingly one of the objects of the invention is to provide a suitable and efficient means for overcoming the difficulties above set forth.

A further object is to provide a suitable means that more closely approaches the required pressure ratio curve which is herein accomplished by a novel arrangement of springs in combination with an improved pressure device.

Still another object is to provide means for taking up the unnecessary play in the pressure device so as to eliminate objectional noise and vibration which are characteristic of certain types of friction transmissions employing conventional pressure devices.

Various other objects and advantages of the invention will be in part obvious from an inspection of the accompanying drawings and a careful consideration of the following particular description and claims of one form of mechanism embodying my invention.

In the drawings:

Figure 1 is a longitudinal section of one form of the present invention;

Figure 2 is a cross section taken on the line 2 of Figure 1.

Figure 3 is a graph representing the desired torque characteristic and the nearest approach thereto actually obtainable.

With reference to the drawings 10 designates a drive shaft to which are keyed for unitary rotation the outer driving disks 11 and 12.

Rotatably supported upon this shaft is a quill 13 to which are splined the spiders 15 and 16 that operatively support the friction wheels 17, 18 and their associated carriers 19 and 20 in a manner permitting angular adjustment to vary the speed ratio of the mechanism. The splined connection of the spiders and quill permits slight axial movement of the two sets of rollers relative to each other.

By means of an anti-friction bearing 21 there is mounted upon the quill 13 a pair of inner disks 22 and 23 which are frictionally driven, said disks being connected together by means of the splines 25 so that they will rotate in unison whilst being axially separable in response to the pressure device hereinafter to be described.

The disks 11, 12, 22 and 23 are provided on their inner faces with annular grooves or races 26 of circular cross section by means of which the disks are drivably engaged by the friction wheels or rollers 17 and 18. A prime mover (not shown) is drivably engaged with the disk 11 by means of a connection 27 the power being transmitted through the shaft 10 to the disk 12.

The friction wheels are shown in the low speed position and are movable to various positions intermediate low and high speeds by a control means (not shown) like or similar to that of my previously mentioned patent.

Disposed within a suitable annular space 30 between the two disks 22 and 23 are a plurality of dished springs 31 which tend to separate the two disks 22 and 23 thus creating a normal no-load frictional engagement between all of the disks and their associated friction wheels.

Supported in a rotationally free manner upon a member 32, is a pressure device ring member 33 provided on its periphery with teeth 29 by which the ring member may be restrained against rotation or else allowed to rotate freely.

In the former case the rollers revolve in the planetary manner and the load is connected thereto by means of the teeth 40 on the spider 16. In the other case the load is connected to the annular member 33 and the rollers are restrained from the planetary revolution by means of teeth 40.

This ring member is also provided with a series of angular pockets 34 of which there are corresponding pockets 35 formed in the disk 23 (Fig. 2) that are adapted to receive the balls 36. Stop pins 37 may be provided to limit the travel of the balls 36. Anti-friction bearings 39 are disposed opposite the balls 36 to take the thrust when the balls in their co-action with the pockets tend to separate the disks 22 and 23.

The operation of the device is as follows:

Assuming the device to be in the low speed position as shown in Figure 1, and the ring member 33 free to rotate, the prime mover will drive the disks 11 and 12 at the same speed since they are both keyed to the shaft 10. The drive will be transmitted to the disks 22 and 23 by means of the friction wheels or rollers 17 and 18 and it is obvious from the position of the wheels that the inner disks 22, 23 will be rotated at lower speed than the outer disks. The operation so far described constitutes just an idling movement of the device without load. When it is desired to actuate a means to be driven said means is connected in some suitable manner to the spider 16 having driving teeth 40 for that purpose, the ring member 33, being held against rotation. This will cause the friction wheels to revolve in the planetary manner in the disk grooves thus rotating both the spiders 15 and 16 about the shaft axis. As the load goes on, the balls 36 will proceed to roll or climb up the inclines of the pockets thus effecting a separating action on the two inner disks which will result in the greater frictional pressure being brought to bear upon the driving elements, the magnitude of which is proportional to the load carried.

With reference to Figure 3, the line "$b\ b$" represents initial spring pressure and "$b\ c$" the total pressure, the difference being the additional pressure supplied by the pressure device. The construction is simple and especially applicable to transmissions for automobiles where the low speed range is not much used or in any case where the transmission is mostly used at some particular ratio. In the latter case the design constants may be so chosen that curve "$b\ c$" is tangent to "$a$" at or near the given ratio.

A simple pressure device or one with springs in series would produce some such curve as the dotted line "$o$—$e$" which would give pressure in the low speed range greatly in excess of that required and thus seriously affect the life of the transmission mechanism under given load conditions beside requiring the mechanism to be designed for stresses greatly in excess of those required.

It has been proposed in the prior art to use balls arranged in pockets which are of varying slope to bring about a close approximation to curve "$a$" but this is very difficult if not commercially impracticable on account of the small movement of the pressure device, the deflection of the parts, the effect of expansion due to heat and the accurate setting required, etc. On the other hand a pressure device of the type shown herein with helical pockets may be easily constructed on standard machines and by using a calibrated spring the play in the pressure device will serve as a gauge for pulling up the nut 50 which takes up the spring 31.

Another advantage of my invention is that a relatively large lead may be used in the pressure device pockets and as the efficiency of the pressure device varies with the lead (the loss being inversely proportional to the lead) the pressure device may be designed according to my construction, for relatively high efficiency.

The use of a relatively high initial spring pressure in these devices is not as objectionable as might at first appear since if these transmissions are operated at high speed they require a relatively high initial pressure to function properly. This is because the coefficient of friction drops very rapidly with the increase in speed when operated below a certain critical pressure.

Variations may be resorted to within the scope of the invention and portions of the improvements may be used without the others, whilst not departing from the spirit of the invention.

Having thus described my invention, I claim:

1. In a friction transmission, the combination of a pair of disks adapted for unitary rotation and axial separation, at least one driving disk, friction rollers adapted for angular displacemnt disposed between said disks in driving relation therewith, a pressure means tending to move the separable disks into frictional driving contact with the driving disks and rollers, and torque responsive means adapted to create driving friction to a greater degree than said pressure means as the load goes on.

2. In a friction transmission, the combination of a pair of driven disks adapted for unitary rotation and relative axial movement, at least one driving disk, friction rollers adapted for angular displacement disposed between said disks in driving relation therewith, a yieldable pressure means adapted to axially move said driven disks in a manner as to create initial driving friction, and a torque responsive means adapted to create a positive driving pressure on the frictionally engaged elements to the extent of the load transmitted.

3. In a friction transmission, the combination of a pair of inner driven disks adapted for unitary rotation and axial separation, a pair of outer driving disks adapted for unitary rotation, friction rollers disposed between said disks in driving relation therewith, a yieldable pressure means adapted to axially separate said inner disks so as to create initial driving friction, and torque responsive means disposed between the inner disks and adapted to force a separation thereof to a degree proportional to the load transmitted.

4. In a friction transmission, the combination of a pair of inner driven disks adapted for unitary rotation and axially separation, a pair of outer driving disks in relatively fixed relation, all of said disks having raceways in opposed driving and driven relation, friction rollers in driving contact with said raceways and adapted for angular displacement to change the driving ratio, a means tending to yieldably separate the driven disks, and a positive torque responsive means forcing said separation to a greater degree.

5. In a friction transmission, the combination of a drive shaft, a pair of outer driving disks secured to said shaft, a pair of inner driven disks rotatably mounted upon said shaft and mutually connected so as to provide axial separation whilst restraining relative rotation, friction rollers between said driving and driven disks adapted for angular displacement to change the driving ratio, a compression spring means disposed between the driven disks to provide initial driving friction, and torque responsive means comprising angularly formed pockets coacting with rolling members to increase the driving friction in proportion to the load transmitted.

6. In a friction transmission, the combination of a drive shaft, a pair of outer driving disks secured to said shaft for rotation therewith, a pair of inner driven disks rotatably mounted upon said shaft and mutually connected so as to permit axial separation whilst restraining relative rotation; one of said driven disks being provided with angular pockets, friction rollers between said driving and driven disks adapted for angular displacement to change the driving ratio, a compression spring means tending to separate the driven disks to provide initial friction, an annular driving element disposed between the driven disks concentric with the drive shaft and provided with angular pockets corresponding with the pockets of the driven disk, rolling members coacting with said pockets to effect a separation of the driven disks when the annular element is restrained against rotation.

7. In a friction transmission mechanism, the combination of a pair of coaxial disks incapable of relative axial movement and relative rotation, a pair of coaxial disks capable of relative axial movement and incapable of relative rotation, friction transmission rollers cooperating with the disks and adapted for angular adjustment to vary the speed ratio of the mechanism, means for driving one pair of disks, and torque-responsive means adapted to produce relative axial movement of the second-mentioned disks with consequent increase of pressure on the rollers cooperating therewith as the load on the mechanism increases.

8. The combination of a pair of coaxial disks capable of relative axial movement but incapable of relative rotation; a pair of disks coaxial with the first pair, incapable of relative axial movement and relative rotation; a set of friction rollers cooperating with one of the first and one of the second pair of disks; a set of friction transmission rollers cooperating with the other disks of the first and second pairs; said sets of rollers being adapted for variable angular adjustment to vary the speed ratio of the mechanism but incapable of relative planetary movement; means for driving a load through the disks and rollers; and torque-responsive means cooperating with the axially movable disks to vary the axial spacing thereof.

9. In a friction transmission mechanism, a shaft; a pair of axially spaced disks fixed thereon; a set of angularly adjustable friction transmission rollers cooperating with one of said disks; a set of angularly adjustable friction transmission rollers cooperating with the other disks, supports for the rollers, connected to prevent relative planetary movement but permit relative axial movement thereof; a two-part intermediate disk arranged between the sets of rollers to cooperate therewith, the parts of the said intermediate disk being connected to prevent relative rotation thereof but permit relative axial movement, at least one of said parts having helical pockets in its inner surface; spring means between the disk parts to separate the same; an annular member arranged between the disk parts and provided with helical pockets facing the pockets in the said disk parts; and balls mounted in the pockets to separate the disk parts and thereby increase the pressure between the same and the cooperating rollers and between the latter and the first mentioned disks.

Signed at Keyport, in the county of Monmouth, and State of New Jersey this 30th day of July, 1930.

FRANK A. HAYES.